(12) United States Patent
Przybysz

(10) Patent No.: US 6,188,695 B1
(45) Date of Patent: Feb. 13, 2001

(54) SYSTEM AND METHOD FOR MULTI-NODE DATA SYNCHRONIZATION

(75) Inventor: Thomas M. Przybysz, Flower Mound, TX (US)

(73) Assignee: Ericsson Inc., Research Triangle Park, NC (US)

(*) Notice: Under 35 U.S.C. 154(b), the term of this patent shall be extended for 0 days.

(21) Appl. No.: 08/993,429

(22) Filed: Dec. 18, 1997

(51) Int. Cl.[7] .................................................. H04J 12/28
(52) U.S. Cl. .......................... 370/410; 370/503; 379/207; 379/229; 709/242
(58) Field of Search .............................. 364/247.5, 955.3, 364/962.1; 707/201, 203, 205; 710/3, 4, 9, 61; 711/169, 170, 205, 207; 370/389, 385, 400, 503, 507, 351, 410; 379/220, 229, 230; 709/220, 221, 222, 238, 242

(56) References Cited

U.S. PATENT DOCUMENTS

| | | | |
|---|---|---|---|
| 5,666,530 | * 9/1997 | Clark et al. | 395/617 |
| 5,684,984 | * 11/1997 | Jones et al. | 395/610 |
| 5,710,922 | * 1/1998 | Alley et al. | 395/617 |
| 5,761,677 | * 6/1998 | Senator et al. | 707/203 |
| 5,991,771 | * 11/1999 | Falls et al. | 707/202 |

* cited by examiner

Primary Examiner—Ricky Ngo
(74) Attorney, Agent, or Firm—Jenkens & Gilchrist, P.C.

(57) ABSTRACT

A telecommunications system and method is disclosed in which a high-availability intelligent node maintains the synchronization of data between various nodes by utilizing both an index manager to administer and manage indices associated with the location of stored data and a data transfer function (DTF) to manage persistent dynamic data updates between nodes. For data updates, a DTF batch transfer function, receives, from the index manager, the data update information and stores the entry in a buffer, which is then forwarded to a DTF batch transfer function residing on another (standby) node. The DTF batch transfer function residing on the non-master node receives the message buffer from the master DTF batch transfer function and stores the values in the indexed memory location specified for that entry. In addition, at startup or reinitialization of the nodes, a DTF bulk transfer function on both the master and standby nodes can be used to achieve synchronization of data.

19 Claims, 3 Drawing Sheets

SYSTEM AND METHOD FOR MULTI-NODE DATA SYNCHRONIZATION

BACKGROUND OF THE PRESENT INVENTION

1. Field of the Invention

The present invention relates generally to telecommunications systems and methods for accessing information stored in various nodes of a highly available computer system, and specifically to providing, within master and standby computer nodes, a data transfer function capable of updating and synchronizing data between the nodes.

2. Background and Objects of the Present Invention

Since the beginning of the telephone in the 1870's, signaling has been an integral part of telephone communications. Such signaling typically includes the call setup, such as the ringing of the called party, and tear-down procedures. In modern telecommunications networks, signaling constitutes the distinct control infrastructure that enables provision of all other services. It can be defined as the system that enables stored program control exchanges, network databases, and other "intelligent" nodes of the network to exchange: (a) messages related to call setup, supervision, and tear-down; (b) information needed for distributed applications processing (inter-process query/response); and (c) network management information.

In addition, the Intelligent Network (IN) and the new Advanced Intelligent Network (AIN) have made possible the transfer of all types of information through the telephone network without special circuits or long installation cycles. In the IN, everything is controlled or configured by workstations with user-friendly software. Telephone service representatives can, therefore, create new services and tailor a subscriber's service from a terminal while talking with the customer. These changes are immediately and inexpensively implemented in the switches, rather than by the more traditional method: expensive programming changes made by certified technicians.

The IN consists of a series of intelligent nodes, each capable of processing at various levels, and each capable of communicating with one another over data links. The basic infrastructure needed is composed of various signaling points, which both perform message discrimination (read the address and determine if the message is for that node), and route messages to other signaling points. The basic three types of signaling points are: (1) Service Switching Points (SSPs); (2) Signal Transfer Points (STPs); and (3) Service Control Points (SCPs), each of which are described in more detail hereinafter.

With reference now to FIG. 1 of the drawings, the many Service Switching Points (SSPs) 100 serve as the local exchanges in a telephone network 90, a portion of which is shown in FIG. 1. The SSPs 100 also provide an Integrated Services Digital Network (ISDN) interface for the Signal Transfer Points (STPs) 110, as is understood in the art.

The STP 110 serves as a router, and switches messages received from a particular SSP 100 through the network 90 to their appropriate destinations (another SSP 100). As is also understood in the art, the STP 110 receives messages in packet form from the SSPs 100. These packets are either related to call connections or database queries. If the packet is a request to connect a call, the message must be forwarded to a destination end office (another SSP 100), where the call will be terminated.

If, however, the message is a database query seeking additional information, the destination will be a database. Database access is provided through the Service Control Point (SCP) 120, which does not store the information, but acts as an interface to a computer that houses the requested information.

In many telecommunications applications, high availability of information and performance is of critical importance. The problem of high-availability is commonly solved by building software and hardware redundancy into the computing systems. From a hardware perspective, this "high-availability" problem is most easily resolved with duplicate computer nodes running in parallel. If the master node becomes unavailable, a standby node is switched into service. The problem of performance is commonly solved by avoiding time-intensive disk reads and writes by implementing memory-based databases, e.g., Random Access Memory (RAM) caches.

Existing technology provides a means for identifying all data that must survive a switchover between various nodes and for storing this data in memory segments of variable size. However, it is imperative that the actual data address of the data in question carry no significance between nodes. Therefore, many intelligent nodes now use an index manager- for administration and management of indices associated with the location of stored data. Thus, when an application requires a location for storage of data, the application sends a request to the index manager for the required amount of memory. Thereafter, the index manager returns a set of indices to the application, which then uses these indices for all updates and retrievals of the stored data. Advantageously, the application need only store the index to the data, instead of the actual value of the data itself.

In today's computer architectures, Input/Output (IO) transactions are very expensive from a performance standpoint, and must be avoided when performance is critical. In highly-available, data-intensive computer systems where performance is critical, disk reads and writes are often avoided by implementing Random Access Memory (RAM) caches (memory-based databases) for data storage. However, the RAM caches in a redundant network must be synchronized between the various nodes of a highly-available computer system to prevent data loss in the event of a switchover between a master and standby node.

For example, for a highly-available general platform Service Control Point, the main problem is how to keep the service, charging, and other relevant persistent data synchronized between multiple computer nodes in a highly-available network system. In addition, the need for high bandwidth (extensive data updates) and quasi-real time (nearly simultaneous data updates) requirements also pose problems for the highly-available SCP.

One solution for data updates for highly-available intelligent nodes includes the use of mirrored data storage disks, in which a data update is performed to one disk, which in turn performs an update to the additional (mirror) disk. However, mirrored disks are expensive and time-consuming due to the fact that the updates are performed sequentially instead of simultaneously and that the updates require input/output writes.

In addition, remote procedure calls have been considered as a possible solution to the problems associated with data updates for highly-available intelligent nodes. When a data update is performed in the master node, a remote procedure call is initiated by the application requesting the data update to the respective application in the standby node to perform a data update. The master application must then wait for a response from the standby application that the update was performed. However, remote procedure calls are both time-consuming and consume too much bandwidth.

It is therefore an object of the invention to provide a fast, efficient and convenient manner of performing data updates between master and standby intelligent nodes that meets both the high bandwidth and quasi-real time requirements.

SUMMARY OF THE INVENTION

The present invention is directed to a telecommunications system and method for providing highly-available, intelligent redundant computing nodes, which utilize both an index manager to administer and manage indices associated with the location of stored data and a Data Transfer Function (DTF) to manage persistent dynamic data updates between nodes. When an application requires a new location for storage of data, the application will send a request to the index manager for the required amount of memory for the data. The index manager will then return a set of indices to the application for use by the application in all updates and retrievals of the stored data. Thereafter, for any updates to the data, a DTF batch transfer function, within the Data Transfer Function (DTF), receives, from the index manager, the new value, the index to the value, and the type of data. The DTF batch transfer function stores the entry in a buffer and forwards the buffer to a DTF batch transfer function residing on the other (standby) node(s). The DTF batch transfer function residing on the standby node(s) then receives the message buffer from the master DTF batch transfer function, iterates through the list of updates, validates them, and stores the data values in the indexed memory location specified for that entry. In addition, at startup or reinitialization of the nodes, a DTF bulk transfer function on both the master and standby nodes can be used to achieve synchronization of data.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

In order to achieve and maintain synchronization of data between at least two computer node, e.g., master and standby nodes, quasi-real time transfers of data between the nodes must take place. This is important during both data updates by requesting applications and startup or reinitialization of the nodes.

Figure 1:
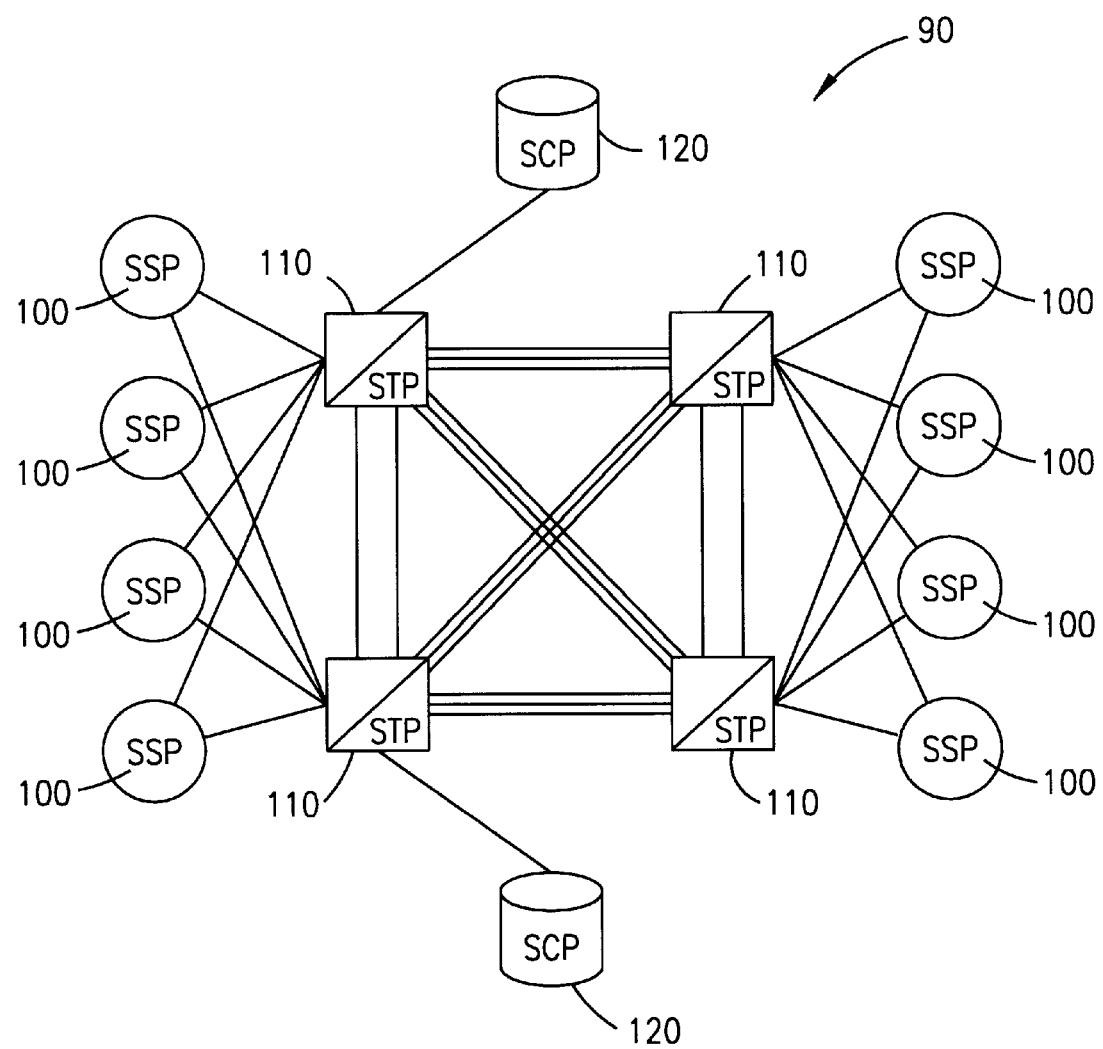
FIG. 1 is a block diagram illustrating some of the basic components used in an Intelligent Network or an Advanced Intelligent Network for signal switching.
Figure 2:
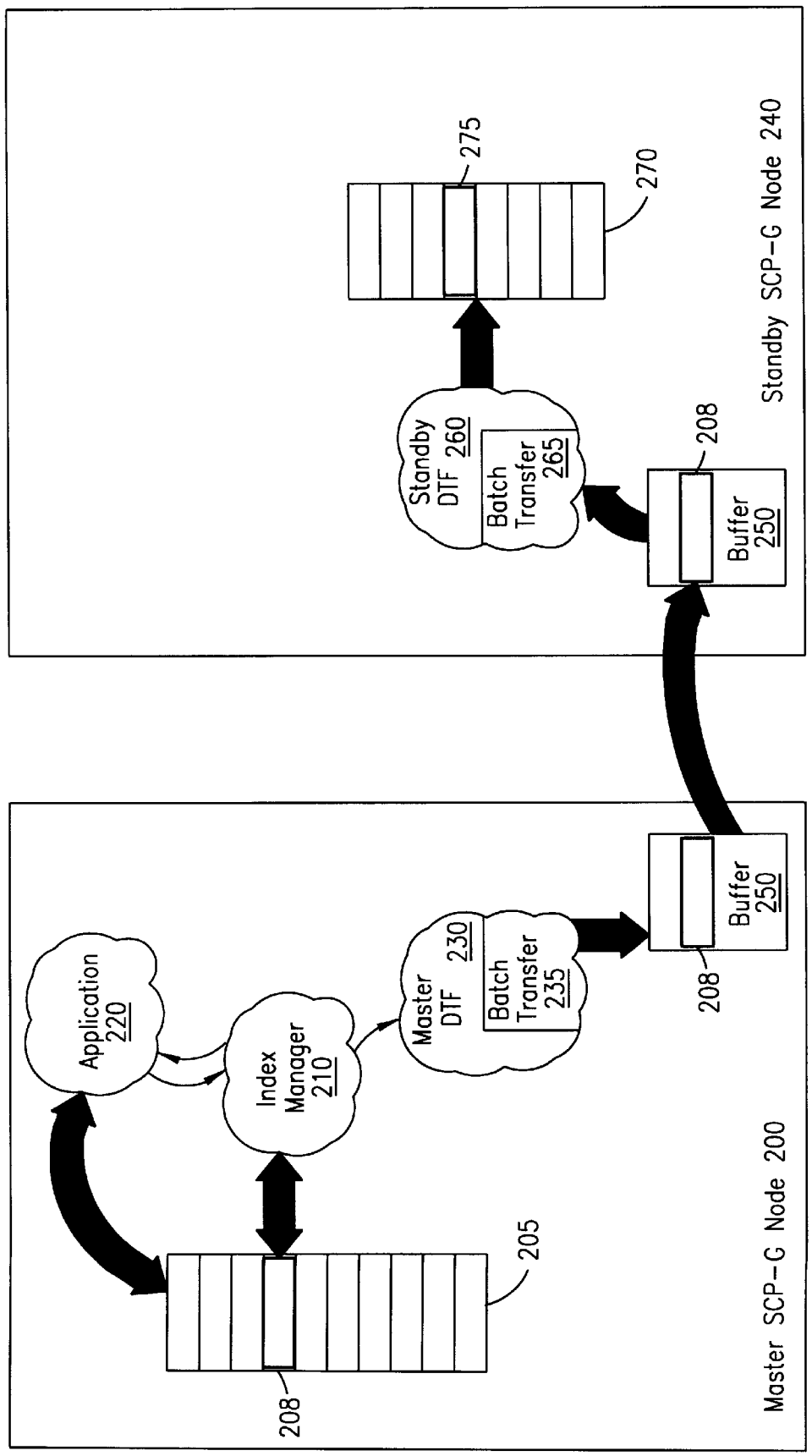
FIG. 2 is a block diagram depicting a Data Transfer Function (DTF) batch transfer function within respective master and standby intelligent nodes in accordance with preferred embodiments of the present invention.

With reference now to FIG. 2 of the drawings, a highly-available master intelligent node, such as a Service Control Point (SCP-G) 200 is shown, which utilizes an index manager 210 for allocation and management of indices associated with the location of stored data elements. When an application 220 requires a location 208 in memory 205 for storage of data, the application 220 sends a request to the index manager 210 for the required amount of memory 205. Thereafter, the index manager 210 returns a set of indices associated with the location 208 of the stored data to the application 220, which then uses these indices for all updates and retrievals of the stored data. Advantageously, the application 220 need only retain the index to the data, instead of the value of the data itself.

In addition, a data transmission algorithm, hereinafter referred to as a Data Transfer Function (DTF) (230 and 260), resides in both the master SCP-G 200 and a standby SCP-G 240, respectively, which acts as a backup to the master SCP-G 200. The master DTF 230 manages persistent dynamic data updates between the master SCP-G 200 and the standby SCP-G 240 in order to keep the two nodes (200 and 240) in sync. Therefore, if the master SCP-G 200 ceases functioning, the standby SCP-G 240 can immediately take over with minimal data loss. For data updates, when the index manager 210 receives an update, it informs a master DTF batch transfer function 235 within the master DTF 230 of the new value, the index to the value, and the type of data. The master DTF batch transfer function 235 then stores the entry in a variable-sized message buffer 250, and forwards the buffer 250 to the DTF batch transfer function 265 within the DTF 260 residing on the standby SCP-G 240. The standby DTF batch transfer function 265 receives the message buffer 250 from the master DTF batch transfer function 235, iterates through the list of updates, validates them, e.g., checks the type of data and the associated index to ensure that the data can be stored in memory 270, e.g., a Random Access Memory (RAM) cache, on the standby SCP-G 240, and stores the values of the data in the indexed memory location 275 specified for that entry. Advantageously, the master DTF 230 and standby DTF 260 are data type independent, which allows all different types of data to be sent between the nodes, including, but not limited to, integers, short integers, long integers, characters, unsigned integers, and unsigned characters.

The master DTF batch transfer function 235 can use one of three transmission criteria for the buffer 250. With the first criteria, the master DTF batch transfer function 235 sends the buffer 250 once the number of updates in the buffer 250 reaches a configurable limit (threshold value). The second criteria consists of the master DTF batch transfer function 235 sending the buffer 250 immediately to the standby SCP-G 240 if the application 220 deems an update "urgent", regardless of whether the threshold is reached. If the update is deemed "urgent", all updates within the buffer 250, along with the urgent update are sent to the standby SCP-G 240. Finally, the master DTF batch transfer function 235 can send the buffer 250 to the standby SCP-G 240 when a configurable timer expires. The master DTF batch transfer function 235 checks the buffer 250 at the expiration of the timer, and if it contains at least one entry, the buffer 250 is sent to the standby SCP-G 240. The timer is then re-fired, unless it is deactivated. Depending upon the time-intensiveness of the application 220 involved, the timer can be deactivated and a low threshold value can be set.

Alternatively, both the threshold value and the timer can be activated concurrently. For example, the threshold value could be set to five and the timer could be set to five milliseconds. When either five new updates have been entered into the buffer 250, or five milliseconds have passed, the buffer 250 will be sent to the standby SCP-G 240, and both the timer and the threshold value will be reset. However, if at the end of the time period, no updates have been entered, the timer will be reset. In addition, when an "urgent" update is received, the buffer 250 will be forwarded to the standby SCP-G 240, and the timer and threshold value will be reset.

Figure 3:
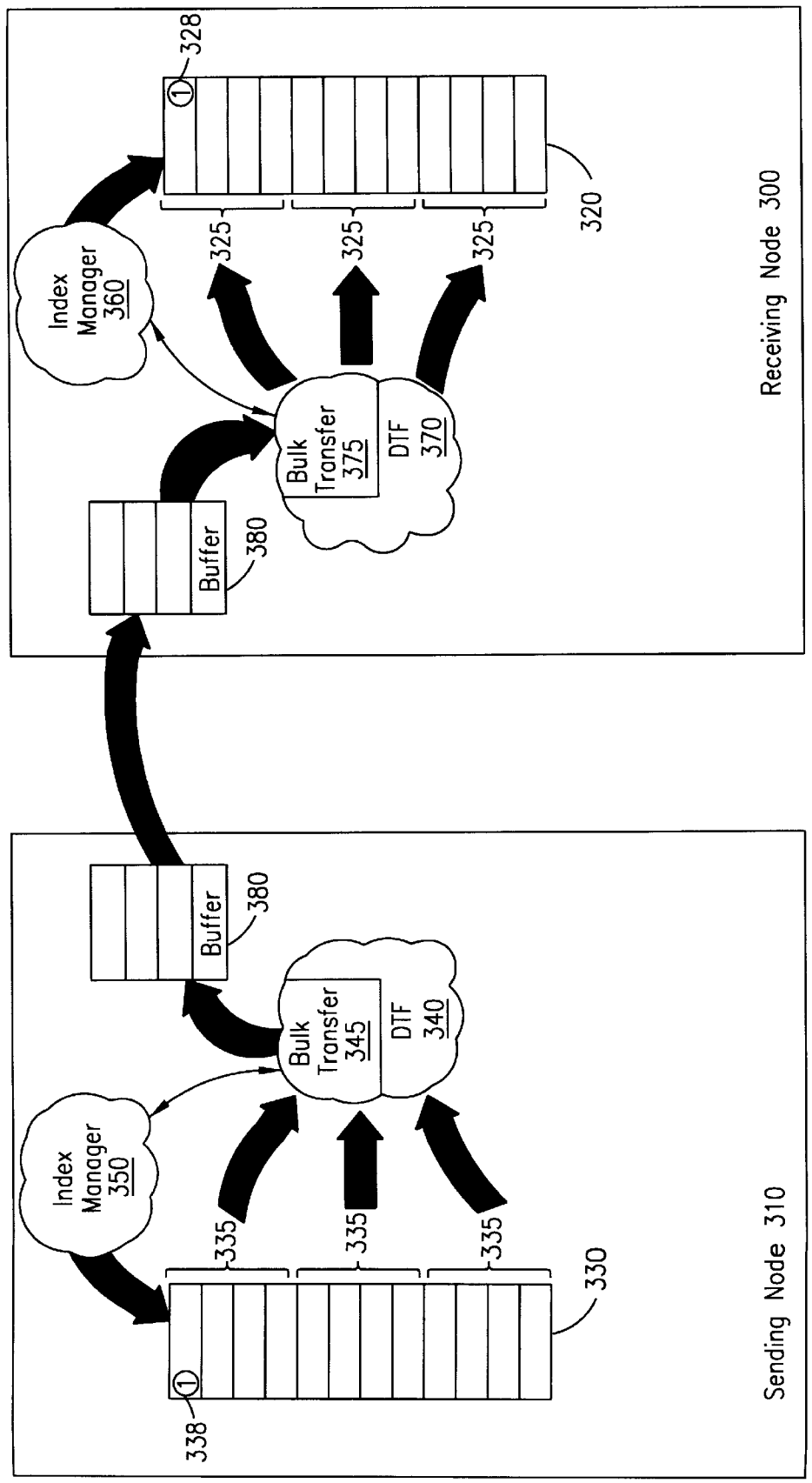
FIG. 3 is a block diagram demonstrating a DTF bulk transfer function within transferring and receiving intelligent nodes, which perform bulk memory copies to a receiving node.

With reference now to FIG. 3 of the drawings, for initialization of persistent data, e.g., Random Access Memory (RAM) cache data (330 and 320), from one intelligent node 310 to another intelligent node 300, respectively, in various situations, such as node recovery, node being brought into service, or a forced refresh, a DTF bulk transfer function 345 within the DTF 340 can be used. This DTF bulk transfer function 345 occupies less time and less bandwidth than individually transferring each stored data value, as is done by the DTF batch transfer function 235 described hereinbefore. The DTF bulk transfer function 345 is a fast, low-bandwidth means of synchronizing a standby node 300 with a master node 310, as is required at startup or reinitialization of a node.

As described hereinbefore, all persistent data is stored in a variable-sized memory segment (330 and 320) on both the master 310 and standby 300 nodes, respectively, which is indexed by a respective index manager (350 and 360). The initialization process begins by the index manager 350 on the transferring node 310 determining a starting memory address 338 and the amount of data in memory 330 that needs to be transferred. Thereafter, the DTF bulk transfer function 345 on the transferring node 310 starts at that persistent data memory location 338 retrieved from the index manager 350 and copies and transmits contiguous configurable-sized portions 335 of the data, e.g., 100 kilobytes of data, through a buffer 380 to the DTF bulk transfer function 375 within the DTF 370 other node 300. When the standby node 300 receives the first configurable sized portion 335 of data, the DTF bulk transfer function 375 on the receiving node 300 then fetches the starting address 328 in the memory 320 from the index manager 360, which can be different from the starting memory address on the master node 310, and does a memory copy directly into persistent memory locations 325 in it's memory 320, starting at the memory location associated with the starting memory address 328 provided by the standby index manager 360, without validation of the data or location.

As will be recognized by those skilled in the art, the innovative concepts described in the present application can be modified and varied over a wide range of applications. Accordingly, the scope of patented subject matter should not be limited to any of the specific exemplary teachings discussed.

For example, there can be several standby intelligent nodes, each with a Data Transfer Function, to which data updates can be performed from the master node in the same manner as described hereinabove.

In addition, the type of intelligent node is not limited to a Service Control Point, but can be any intelligent node with a high-availability requirement, such as a Service Switching Point or a WEB-server.

What is claimed is:

1. A telecommunications system for updating and synchronizing data between a master intelligent node and at least one standby intelligent node, said telecommunications system comprising:

bulk transfer means within said master and standby intelligent nodes for transferring data stored within a master memory within said master node to a standby memory within said standby intelligent node, said bulk transfer means transferring substantially contiguous, configurable-sized portions of said data;

a master index manager within said master intelligent node for allocating an index associated with the location of a stored data element in said master memory, said index being a master starting memory address within said master memory of a given one of said configurable-sized portions of said data;

a master data transfer function within said master intelligent node for receiving said index from said index manager and said data element;

a buffer within said master intelligent node for storing said given configurable-sized portion of said data, beginning with said stored data element;

a standby data transfer function on said standby intelligent node, said buffer being forwarded to said standby data transfer function, said given configurable-sized portion of said data being copied into said standby memory by said standby bulk transfer means starting at the location in said standby memory associated with a standby starting memory address; and a standby index manager within said standby intelligent node, said standby bulk transfer means receiving said standby starting memory address from said standby index manager.

2. The telecommunications system of claim 1, wherein said master and standby intelligent nodes are Service Control Points.

3. A telecommunications system for updating and synchronizing data between a master intelligent node and at least one standby intelligent node, said telecommunications system comprising:

a master index manager within said master intelligent node for allocating an index associated with the location of a stored data element in a master memory on said master intelligent node, said data element having a type associated therewith, said index being associated with a master memory address for said data element within said master memory and a standby memory address for said data element within said standby memory, said index being used by an application within said master and standby intelligent nodes for retrieval of the value associated with said data element;

a master data transfer function within said master intelligent node having a master batch transfer function for performing data updates between said master and standby intelligent nodes therein, said master batch transfer function receiving a new value associated with said data element, said index and said type from said index manager;

a buffer within said master intelligent node for storing said new value associated with said data element, said index and said type; and a standby data transfer function within said standby intelligent node having a standby batch transfer function therein, said buffer being forwarded to said standby data transfer function, said standby batch transfer function verifying said type and said index and storing said new value in a standby memory within said standby intelligent node, using said index.

4. The telecommunications system of claim 3, wherein said type is selected from the group consisting of: integers, short integers, long integers, characters, unsigned integers, and unsigned characters.

5. The telecommunications system of claim 3, wherein said master batch transfer function forwards said buffer to said standby batch transfer function when a threshold value is reached.

6. The telecommunications system of claim 5, wherein said buffer stores multiple ones of said index, said threshold value being based on a configurable number of said indices.

7. The telecommunications system of claim 3, wherein said buffer is forwarded to said standby batch transfer function when said new value has an urgent message associated therewith.

8. The telecommunications system of claim 3, wherein said buffer is forwarded to said standby batch transfer function when a timer within said master intelligent node expires.

9. The telecommunications system of claim 3, wherein said master and standby intelligent nodes are Service Control Points.

10. A method for updating and synchronizing data between a master intelligent node and at least one standby intelligent node, said method comprising the steps of:
   allocating, by an index manager within said master intelligent node, an index associated with the location of a stored data element in a master memory within said master intelligent node;
   receiving, by a master data transfer function within said master intelligent node, said index from said index manager and said data element, said master data transfer function having master bulk transfer means therein, said master bulk transfer means transferring substantially contiguous, configurable-sized portions of said data to said standby intelligent node, said index being a master starting memory address within said master memory of a given one of said configurable-sized portions of said data;
   storing, by said bulk transfer means within said master intelligent node, said given configurable-sized portion of said data, beginning with said stored data element in a buffer within said master intelligent node;
   forwarding said buffer, by said master data transfer function, to a standby data transfer function within said standby intelligent node;
   receiving, by standby bulk transfer means within said standby data transfer function, a standby starting memory address from a standby index manager within said standby intelligent node; and
   storing, by said standby bulk transfer means, said given configurable-sized portion of said data into a standby memory within said standby intelligent node starting at the location in said standby memory associated with said standby starting memory address.

11. The method of claim 10, wherein said master and standby intelligent nodes are Service Control Points.

12. A method for updating and synchronizing data between a master intelligent node and at least one standby intelligent node, said method comprising the steps of:
   allocating, by an index manager within said master intelligent node, an index associated with the location of a stored data element in a master memory within said master intelligent node, said data element having a type associated therewith, said index being associated with a master memory address for said data element within said master memory and a standby memory address for said data element within a standby memory within said standby intelligent node, said index being used by an application within said master intelligent node to retrieve the value associated with said data element;
   receiving, by a master batch transfer function within a master data transfer function within said master intelligent node, said index, a new value associated with said data element and said type from said master index manager, said master batch transfer function for performing data updates between said master and standby intelligent nodes;
   storing, by a master batch transfer function within said master data transfer function, said new value associated with said data element, said index and said type in a buffer within said master intelligent node;
   forwarding said buffer, by said master data transfer function, to a standby data transfer function within said standby intelligent node;
   verifying, by a standby batch transfer function within said standby data transfer function, said type and said index; and
   storing, by said standby batch transfer function, said new value in said standby memory, using said index.

13. The method of claim 12, wherein said type is selected from the group consisting of: integers, short integers, long integers, characters, unsigned integers, and unsigned characters.

14. The method of claim 12, wherein said step of forwarding is performed when a threshold value is reached.

15. The method of claim 14, wherein said buffer stores multiple ones of said index, said threshold value being based on a predefined number of said indices.

16. The method of claim 12, wherein said step of forwarding is performed when said new value has an urgent message associated therewith.

17. The method of claim 12, wherein said step of forwarding is performed when a timer within said master intelligent node expires.

18. The method of claim 12, further comprising, after said step of storing said new value in said standby memory, the steps of:
   receiving, by said standby batch transfer function, data stored in said standby memory;
   transferring, by said standby batch transfer function, said data to said master batch transfer function, using said buffer; and
   copying, by said master batch transfer function, said data into said master memory.

19. The method of claim 12, wherein said master and standby intelligent nodes are Service Control Points.

* * * * *